United States Patent
Yun et al.

(10) Patent No.: US 11,921,929 B2
(45) Date of Patent: Mar. 5, 2024

(54) STEREOSCOPIC SURFACE DISPLAY DEVICE AND OPERATION METHOD OF THE SAME

(71) Applicant: ELECTRONICS AND TELECOMMUNICATIONS RESEARCH INSTITUTE, Daejeon (KR)

(72) Inventors: Sung Ryul Yun, Daejeon (KR); Seung Koo Park, Daejeon (KR); Inwook Hwang, Daejeon (KR); Seongcheol Mun, Daejeon (KR); Mi Jeong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/106,650

(22) Filed: Feb. 7, 2023

(65) Prior Publication Data

US 2023/0269362 A1     Aug. 24, 2023

(30) Foreign Application Priority Data

Feb. 24, 2022  (KR) .................. 10-2022-0024615
Dec. 23, 2022  (KR) .................. 10-2022-0183050

(51) Int. Cl.
*G06F 3/01* (2006.01)
*F03G 7/00* (2006.01)
(Continued)

(52) U.S. Cl.
CPC .............. *G06F 3/016* (2013.01); *F03G 7/016* (2021.08); *G05D 5/02* (2013.01); *H04N 13/393* (2018.05);
(Continued)

(58) Field of Classification Search
CPC ......... G09G 3/3266; G09G 2300/0426; G09G 2300/0842; G09G 2310/0267;
(Continued)

(56) References Cited

U.S. PATENT DOCUMENTS 9,017,795 B2  4/2015  Keefe et al.
9,075,525 B2  7/2015  Ciesla et al.
(Continued)

FOREIGN PATENT DOCUMENTS

JP          H1074039 A      3/1998
KR   10-2015-0012400 A     2/2015
(Continued)

OTHER PUBLICATIONS

Inwook Hwang et al., "A Light-Driven Vibrotactile Actuator with a Polymer Bimorph Film for Localized Haptic Rendering", ACS Applied Materials & Interfaces, 2021, 13, 6597-6605.
(Continued)

*Primary Examiner* — Premal R Patel
(74) *Attorney, Agent, or Firm* — LRK PATENT LAW FIRM

(57) ABSTRACT

Provided is a stereoscopic surface display device including a stereoscopic display unit having a cell area, wherein the stereoscopic display unit includes a first flexible layer, a first optical waveguide and a first optical output unit in the first flexible layer, wherein the first optical output unit are disposed in the cell area, a first light source disposed on a side of the stereoscopic display unit, wherein the first optical waveguide connects the first light source and the first optical output unit, a first photothermal response layer on the first flexible layer, wherein the first photothermal response layer is configured to receive output light emitted from the first optical output unit and emit thermal energy, and a shape deformation layer on the first photothermal response layer,
(Continued)

wherein the shape deformation layer is configured to generate bending deformation by receiving the thermal energy from the first photothermal response layer.

18 Claims, 15 Drawing Sheets

(51) Int. Cl.
| | |
|---|---|
| *G05D 5/02* | (2006.01) |
| *H04N 13/393* | (2018.01) |
| *G06F 1/16* | (2006.01) |
| *G06V 40/13* | (2022.01) |
| *G09B 21/00* | (2006.01) |

(52) U.S. Cl.
CPC ............ *G06F 1/163* (2013.01); *G06F 1/1652* (2013.01); *G06V 40/1306* (2022.01); *G09B 21/003* (2013.01)

(58) Field of Classification Search
CPC ....... G09G 2310/0286; G09G 2310/08; G09G 2320/0233; G09G 3/3233; G09G 2300/0819; G09G 2300/0861; G09G 2320/0219; G09G 2320/0223; G09G 2320/0238; G09G 3/32; G09G 3/3225; G09G 2330/00

See application file for complete search history.

(56) References Cited

U.S. PATENT DOCUMENTS

| | | | |
|---|---|---|---|
| 11,275,444 B2 | 3/2022 | Yun et al. | |
| 2012/0206364 A1* | 8/2012 | Ciesla | G06F 3/04886 345/173 |
| 2014/0320436 A1* | 10/2014 | Modarres | G06F 1/1652 345/173 |
| 2017/0068318 A1* | 3/2017 | McClure | G06F 3/016 |
| 2017/0336869 A1* | 11/2017 | Khoshkava | G06F 1/1643 |
| 2020/0094521 A1* | 3/2020 | Takahashi | B32B 7/027 |
| 2021/0074959 A1* | 3/2021 | Khoshkava | H01M 50/136 |

FOREIGN PATENT DOCUMENTS

| | | |
|---|---|---|
| KR | 10-2325014 B1 | 11/2021 |
| WO | 2020/0153693 A1 | 7/2020 |

OTHER PUBLICATIONS

Choonghyun Son et al., "A flexible multimodal tactile display array for virtual shape and texture, Microsystem Technologies", vol. 22, 2587-2594, 2015.

Nadine Besse et al., "Flexible Active Skin: Large Reconfigurable Arrays of Individually Addressed Shape Memory Polymer Actuators", Advanced Materials Technology, vol. 2, 1700102, 2017.

* cited by examiner

STEREOSCOPIC SURFACE DISPLAY DEVICE AND OPERATION METHOD OF THE SAME

CROSS-REFERENCE TO RELATED APPLICATIONS

This U.S. non-provisional patent application claims priority under 35 U.S.C. § 119 of Korean Patent Application Nos. 10-2022-0024615, filed on Feb. 24, 2022, and 10-2022-0183050, filed on Dec. 23, 2022, the entire contents of which are hereby incorporated by reference.

BACKGROUND

1. Field of the Invention

The inventive concept relates to a stereoscopic surface display device and an operating method thereof, and more particularly, to a flexible/wearable stereoscopic surface display device and an operating method thereof.

2. Description of Related Art

Due to the development and spread of touch screen-based portable electronic devices and electronic information devices such as kiosks, a user interface (UI) provided on a flat visual information display and a touch interface have become popular worldwide. Currently, most of the flat-type touch interfaces provide only tactile feedback in the form of transmitting vibration to the finger when the user touches the surface with the finger.

Tactile feedback provides the feeling of clicking a button by controlling the dynamic drive signals of actuators (motors, voice coils, etc.). There is also a tactile feedback technology that varies the intensity of vibration according to the contact force. However, the tactile information that may be provided through adjusting the vibration signal waveform and strength may provide only a feeling of operation of the UI. Existing tactile feedback is difficult to deliver a physical three-dimensional structure with visual information. Accordingly, various studies are being conducted to express the shape of visual information or to implement a braille display through physical transformation. For example, a technique for protruding a flexible thin film on a magnet has been studied by adjusting the vertical position of blocks arranged in an array with a large motor system or by adjusting the vertical position of a magnet through pneumatic pressure.

SUMMARY

The inventive concept provides a bendable and wearable stereoscopic surface display device having excellent durability.

The inventive concept also provides a method of operating the stereoscopic surface display device.

An embodiment of the inventive concept provides a stereoscopic surface display device including a stereoscopic display unit having a cell area, wherein the stereoscopic display unit includes a first flexible layer, a first optical waveguide and a first optical output unit in the first flexible layer, wherein the first optical output unit are disposed in the cell area, a first light source disposed on a side of the stereoscopic display unit, wherein the first optical waveguide connects the first light source and the first optical output unit, a first photothermal response layer on the first flexible layer, wherein the first photothermal response layer is configured to receive output light emitted from the first optical output unit and emit thermal energy, and a shape deformation layer on the first photothermal response layer, wherein the shape deformation layer is configured to generate bending deformation by receiving the thermal energy from the first photothermal response layer.

In an embodiment of the inventive concept, a stereoscopic surface display device including a stereoscopic display unit having a plurality of cell areas, wherein the stereoscopic display unit includes a first flexible layer, a plurality of lower optical output units provided in the first flexible layer, wherein the plurality of lower optical output units is disposed in the plurality of cell areas, respectively, a first photothermal response layer on the first flexible layer, wherein the first photothermal response layer is configured to receive lower light emitted from the plurality of lower optical output units and emit first thermal energy, a shape deformation layer on the first photothermal response layer, a second photothermal response layer on the shape deformation layer, a second flexible layer on the second photothermal response layer, and a plurality of upper optical output units provided in the second flexible layer, wherein the second photothermal response layer is configured to receive upper light emitted from the plurality of upper optical output units and emit second thermal energy.

In an embodiment of the inventive concept, an operating method of a stereoscopic surface display device includes irradiating incident light from the light source to the optical waveguide, wherein the optical waveguide guides the incident light to the optical output unit, emitting output light from the optical output unit to the photothermal response layer, wherein the photothermal response layer receives the output light and generates thermal energy, heating the shape deformation layer using the thermal energy, wherein the shape deformation layer is heated so that a modulus of elasticity in the shape deformation layer decreases and a coefficient of thermal expansion in the shape deformation layer increases, and generating bending deformation in the shape deformation layer through a difference between the increased coefficient of thermal expansion of the shape deformation layer and the coefficient of thermal expansion of the photothermal response layer.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
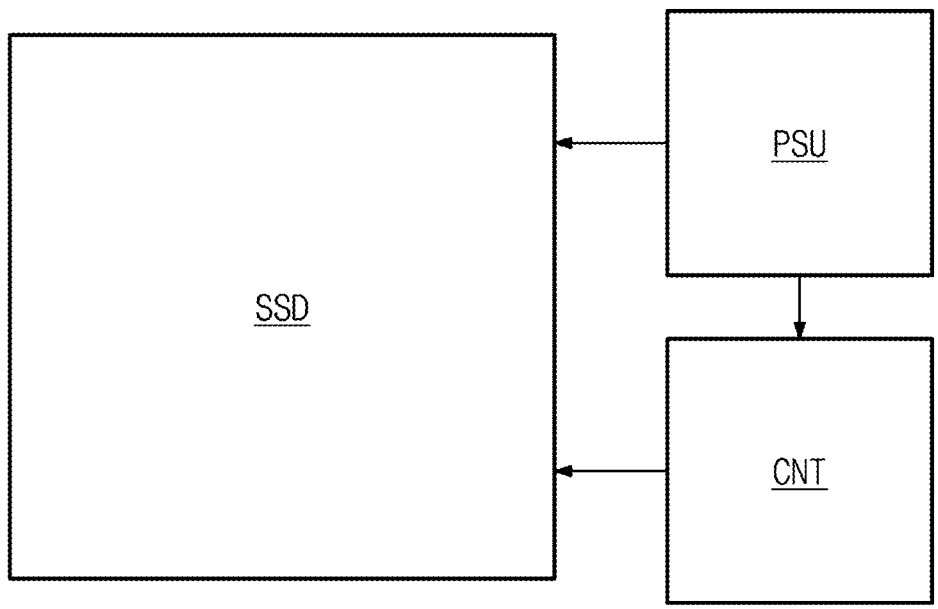
FIG. 1 is a schematic diagram showing constituent units of a stereoscopic surface display device according to embodiments of the inventive concept.

In order to fully understand the configuration and effects of the inventive concept, preferred embodiments of the inventive concept will be described in detail with reference to the accompanying drawings. The inventive concept is not limited to the embodiments disclosed below, but may be implemented in various forms, and various modifications and changes may be added. However, it is provided to completely disclose the technical idea of the inventive concept through the description of the present embodiments, and to fully inform a person of ordinary skill in the art to which the inventive concept belongs.

In this specification, when a component is referred to as being on another component, it may be directly formed on the other component or a third component may be interposed therebetween. In addition, in the drawings, the thickness of the components is exaggerated for effective description of the technical content. Like reference numerals refer to like elements throughout the specification.

In various embodiments of the present specification, terms such as first, second, third, etc. are used to describe various components, but these components should not be limited by these terms. These terms are only used to distinguish one component from another component. The embodiments described and illustrated herein also include complementary embodiments thereof.

The terms used in this specification are for describing embodiments and are not intended to limit the inventive concept. In this specification, the singular form also includes the plural form unless specifically stated in the phrase. As used in the specification, "comprises" and/or "comprising" do not exclude the presence or addition of one or more other elements.

The stereoscopic surface display device of the inventive concept may be used as a flexible element and/or a wearable element. The stereoscopic surface display device of the inventive concept may include various electronic devices applicable to flexible elements. Hereinafter, a stereoscopic surface display device according to embodiments of the inventive concept will be described.

FIG. 1 is a schematic diagram showing constituent units of a stereoscopic surface display device according to embodiments of the inventive concept.

Referring to FIG. 1, the stereoscopic surface display device may include a stereoscopic display unit SSD, a control unit CNT, and a power supply unit PSU. The stereoscopic display unit SSD may include at least one cell whose surface shape changes. The stereoscopic display unit SSD may be a flexible display capable of being bent or bent. The stereoscopic display unit SSD may output information required by a user in a stereoscopic shape.

The control unit CNT may control the stereoscopic display unit SSD to change the shape of at least one cell in the stereoscopic display unit SSD. A signal processed by the control unit CNT may be input to the stereoscopic display unit SSD and displayed in a shape corresponding to the signal. As an embodiment of the inventive concept, the control unit CNT may include a System On Chip (SOC).

The power supply unit PSU may supply power required by the stereoscopic surface display device. Specifically, the power supply unit PSU may supply power to the stereoscopic display unit SSD and the control unit CNT. In one embodiment of the inventive concept, the power supply unit PSU may include a portable battery. For example, the power supply unit PSU may include a lithium secondary battery. A battery of the power supply unit PSU may be configured to be applicable to a flexible device.

As another embodiment of the inventive concept, the stereoscopic surface display device may further include an audio output unit. A voice signal processed by the control unit CNT may be output as audio through an audio output unit. The stereoscopic surface display device may further include a sensor unit. For example, the sensor unit may be provided in the stereoscopic display unit SSD. The sensor unit may include at least one of an eye recognition sensor for recognizing the user's eyes, a motion recognition sensor for recognizing the user's motion, a touch sensor for recognizing the user's touch, and a voice recognition sensor for recognizing the user's voice.

Figure 2:
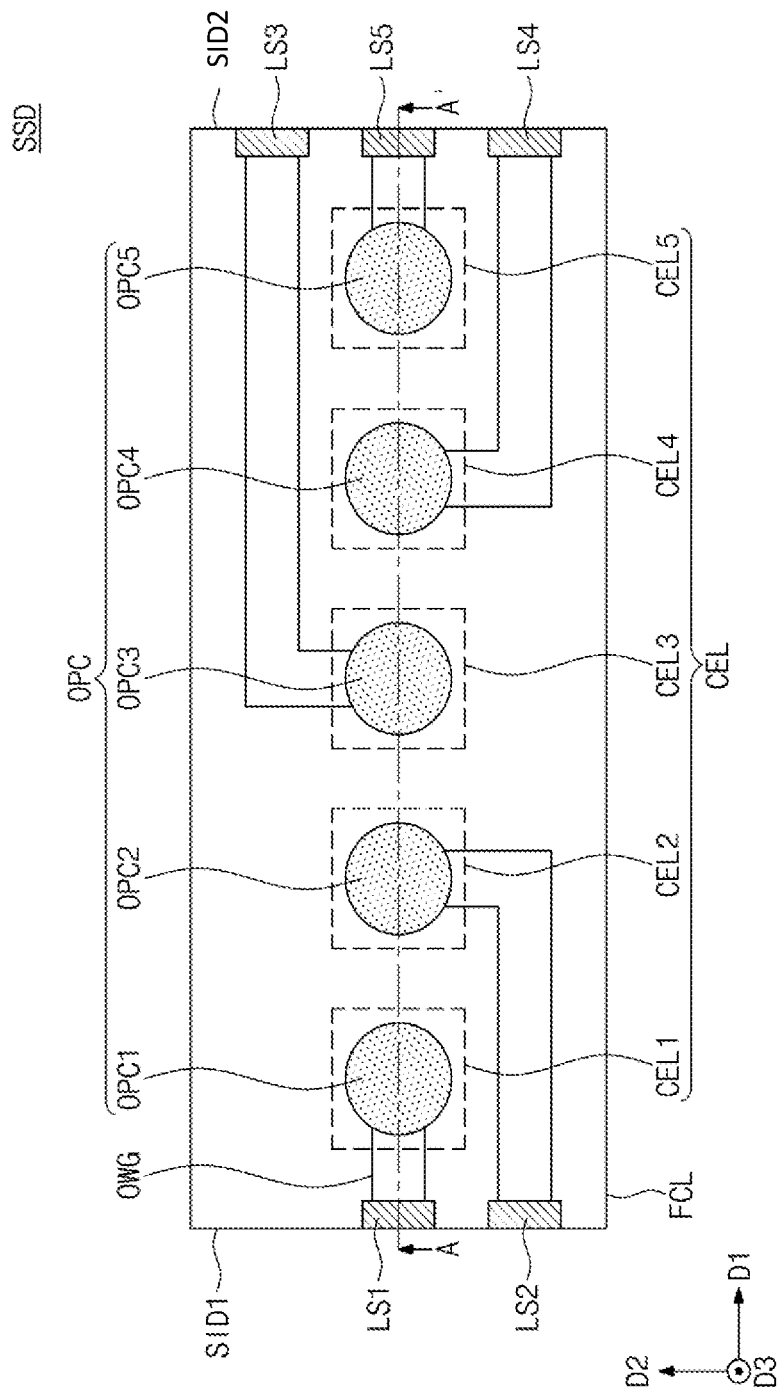
FIG. 2 is a plan view for explaining a stereoscopic display unit according to embodiments of the inventive concept.
Figure 3:
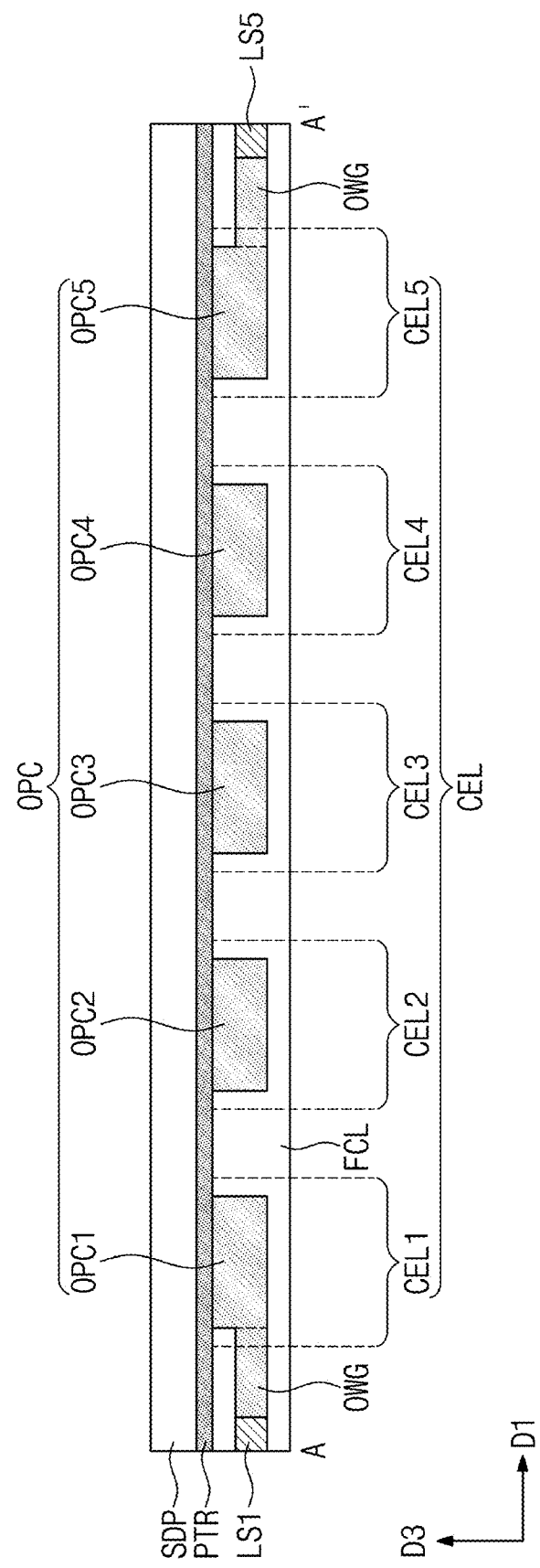
FIG. 3 is a cross-sectional view taken along line A-A' of FIG. 2.

FIG. 2 is a plan view for explaining a stereoscopic display unit according to embodiments of the inventive concept. FIG. 3 is a cross-sectional view taken along line A-A' of FIG. 2. Referring to FIGS. 2 and 3, a stereoscopic display unit SSD may include a plurality of cell areas CEL. For example, the plurality of cell areas CEL may include first to fifth cell areas CEL1 to CEL5. The first to fifth cell areas CEL1 to CEL5 may be arranged at regular intervals.

An optical output unit OPC may be provided in each of the cell areas CEL. For example, first to fifth optical output units OPC1 to OPC5 may be provided in the first to fifth cell areas CEL1 to CEL5, respectively.

As an embodiment of the inventive concept, the stereoscopic display unit SSD may include both sides SID1 and SID2 facing each other in the first direction D1. A plurality of light sources LS1 to LS5 may be disposed on both sides SID1 and SID2. For example, a first light source LS1 and a second light source LS2 may be disposed on the first side SID1. A third light source LS3, a fourth light source LS4, and a fifth light source LS5 may be disposed on the second side SID2.

Each of the first to fifth light sources LS1 to LS5 may input light (or an optical signal) to the optical waveguide OWG. For example, each of the first to fifth light sources LS1 to LS5 may include a light emitting diode (LED), an organic light emitting diode (OLED), or a laser diode. However, the light source of the inventive concept is not limited to the above examples, and any means that is disposed on both sides SID1 and SID2 of the stereoscopic display unit SSD and may input light to the optical waveguide OWG may be used as a light source without limitation.

The first to fifth light sources LS1 to LS5 may be respectively connected to the first to fifth optical output units OPC1 to OPC5 through optical waveguides OWG. The first to fifth light sources LS1 to LS5 may not be disposed within the first to fifth cell areas CEL1 to CEL5. In other words, the first to fifth light sources LS1 to LS5 may not vertically overlap the first to fifth cell areas CEL1 to CEL5.

According to embodiments of the inventive concept, when the first to fifth light sources LS1 to LS5 are respectively provided in the first to fifth cell areas CEL1 to CEL5, the flexible characteristics of the first to fifth cell areas CEL1 to CEL5 may be adversely affected. Therefore, by disposing the relatively inflexible first to fifth light sources LS1 to LS5 on both sides SID1 and SID2 of the stereoscopic display unit SSD, it is possible to further improve the flexible characteristics of the stereoscopic display unit SSD and the stereoscopic shape realization characteristics of the stereoscopic display unit SSD.

Referring back to FIG. 3, the stereoscopic display unit (SSD) may include a flexible layer FCL, a photothermal response layer PTR, and a shape deformation layer SDP sequentially stacked. Each of the flexible layer FCL, the photothermal response layer PTR, and the shape deformation layer SDP may be made of a flexible material so that its shape may be deformed. For example, the elastic modulus of each of the flexible layer FCL, the photothermal response layer PTR, and the shape deformation layer SDP may be 0.1 MPa to 2,000 MPa.

An optical waveguide OWG and an optical output unit OPC connected to the optical waveguide OWG may be provided in the flexible layer FCL. An optical waveguide OWG and an optical output unit OPC may be a core layer through which light travels. In one embodiment, an optical waveguide OWG and an optical output unit OPC are connected to each other and may include the same material as each other. That is, the optical waveguide OWG and the optical output unit OPC may integrally constitute a core layer.

An optical waveguide OWG may guide incident light from light sources LS1 to LS5 to proceed to an optical output unit OPC. The optical output unit OPC may output incident light to the photothermal response layer PTR.

The flexible layer FCL may function as a clad layer surrounding the core layer. The flexible layer FCL may include a material having a lower refractive index than the optical waveguide OWG and the optical output unit OPC. The flexible layer FCL may prevent light traveling along the optical waveguide OWG from being emitted to the outside.

The flexible layer FCL, the optical waveguide OWG, and the optical output unit OPC may be made of a flexible material. The flexible layer FCL, the optical waveguide OWG, and the optical output unit OPC may be configured to be thin and soft so as not to reduce deformation of the shape deformation layer SDP to be described later. For example, the elastic modulus of the flexible layer FCL, the optical waveguide OWG, and the optical output unit OPC may be 0.1 MPa to 2,000 MPa.

The photothermal response layer PTR may be configured to have a photo-thermal effect that generates heat by absorbing light (e.g., visible light or infrared light). The photothermal response layer PTR may include a photo-thermal material that may emit heat by absorbing light (e.g., visible light or infrared light). For example, the photothermal response layer PTR may include at least one selected from the group consisting of poly(3,4-ethylenedioxythiophene) (PEDOT), poly(3,4-ethylenedioxythiophene)-poly(styrene sulfonate) (PEDOT:PSS), PEDOT/Metallic particle composite, PEDOT/oxide composite, graphene, carbon nanotube, and silver nanowire (AgNW).

The photothermal response layer PTR may include a polymer having ductility and elasticity and a light absorbing material (or particles) dispersed therein. The polymer may include poly(dimethylsiloxane), acrylic elastomer, silicone rubber, or liquid crystalline elastomer (LCE).

The photothermal response layer PTR may be provided on one side or both sides of the shape deformation layer SDP to be described later. When it is ductile by transferring thermal energy to the shape deformation layer SDP, the photothermal response layer PTR may have variable mechanical properties along with the shape deformation layer SDP.

For example, forming the photothermal response layer PTR includes forming a polymer film having a photothermal effect using a surface coating method (e.g., spray coating or spin coating) on the flexible layer FCL.

The shape deformation layer SDP may change mechanical properties (e.g., Young's modulus or elastic modulus) according to temperature. The shape deformation layer SDP may reversibly change the coefficient of thermal expansion (CTE). The shape deformation layer SDP may be capable of reversibly restoring its shape.

In one embodiment of the inventive concept, the CTE of the shape deformation layer SDP at room temperature (e.g., 20° C.) may be smaller than the CTE of the photothermal response layer PTR. When the temperature of the shape deformation layer SDP increases, the elastic modulus of the shape deformation layer SDP may decrease and the CTE may increase. A rate of change of CTE according to temperature of the shape deformation layer SDP may be greater than a rate of change of CTE according to temperature of the photothermal response layer PTR. Therefore, above a certain temperature, the CTE of the shape deformation layer SDP may be greater than that of the photothermal response layer PTR.

The shape deformation layer SDP may include at least one selected from the group consisting of poly(tert-butyl acrylate) (PTBA), poly(tert-butyl acrylate)-g-poly(dithylsiloxane) (PTBA-g-PDMS), a tert-butyl acrylate copolymer, and a stearyl acrylate polymer. For example, the shape deformation layer SDP may include a shape memory polymer.

According to an embodiment of the inventive concept, each cell area CEL of the stereoscopic display unit SSD may further include a sensor unit. The sensor unit may be configured to recognize a user's touch applied to the shape-changed cell area CEL.

Figure 4A:
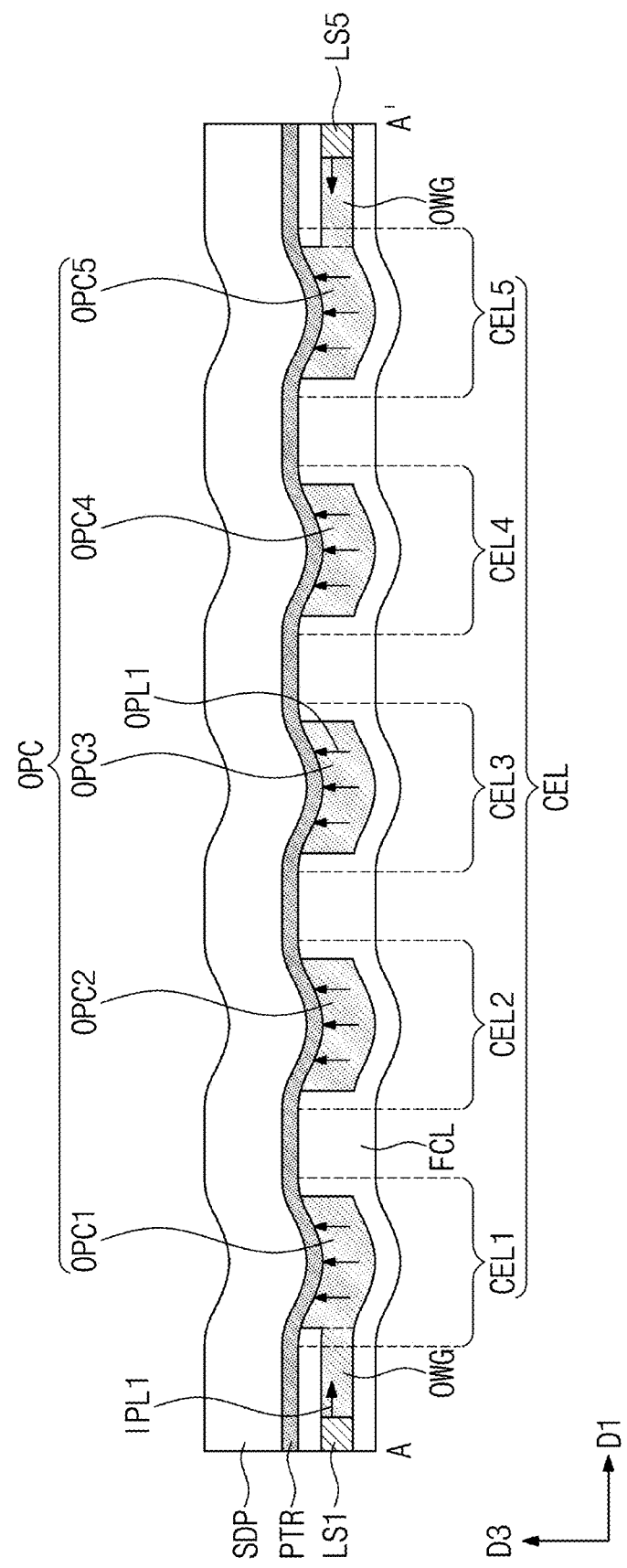
FIGS. 4A, 4B and 4C are cross-sectional views for explaining the operation of a stereoscopic surface display device according to embodiments of the inventive concept.
Figure 4B:
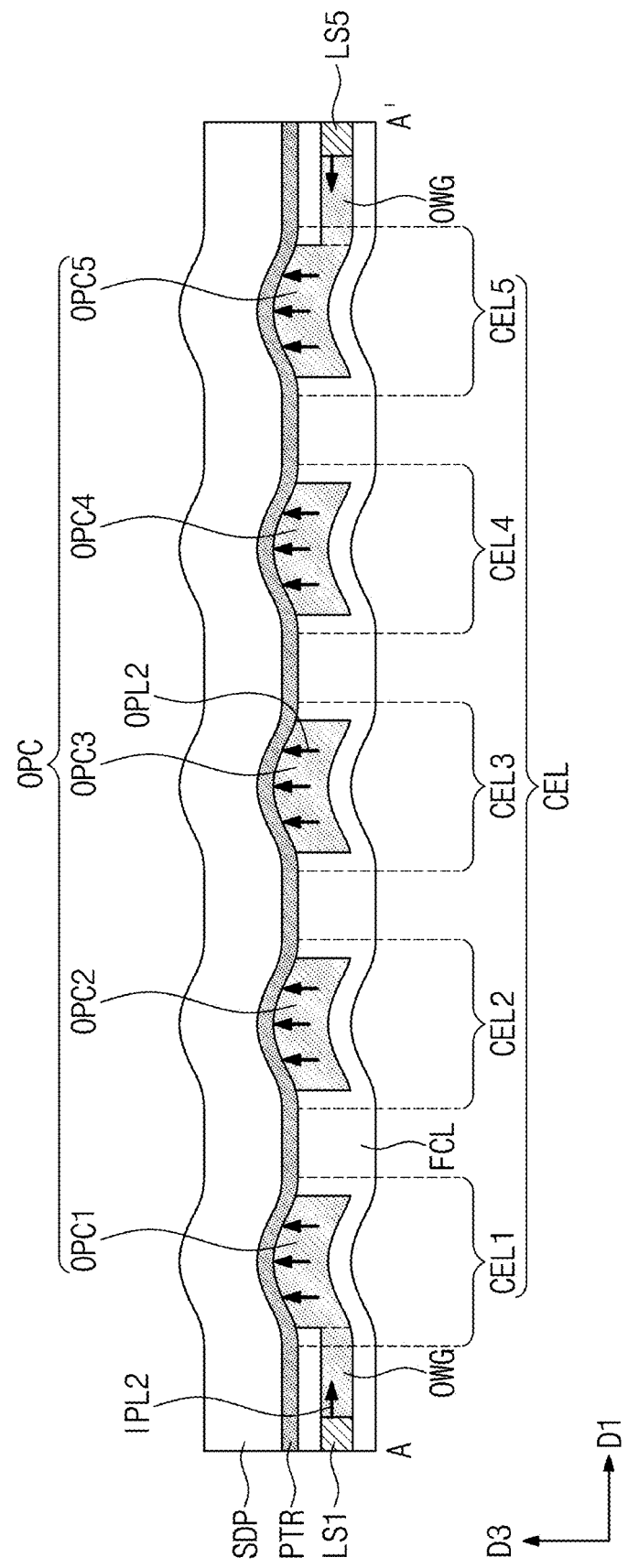
Figure 4C:
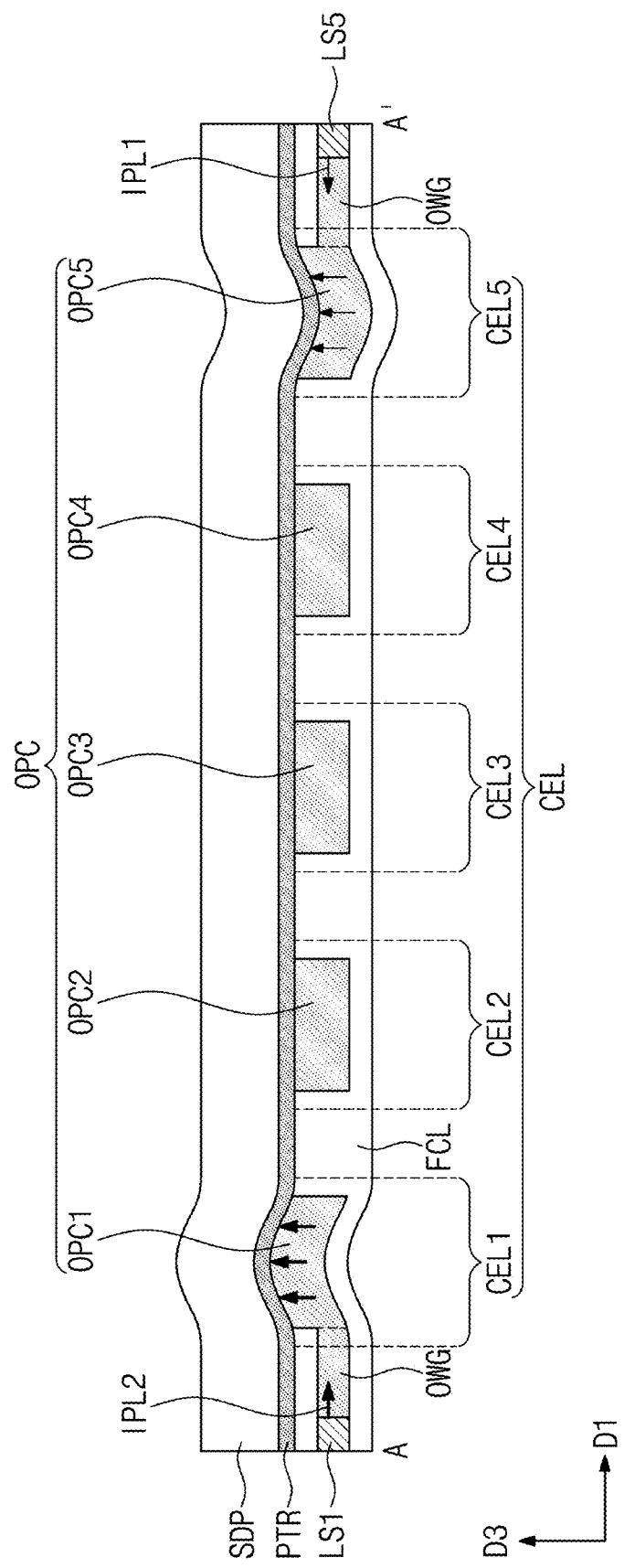

FIGS. 4A, 4B and 4C are cross-sectional views for explaining the operation of a stereoscopic surface display device according to embodiments of the inventive concept.

Referring to FIG. 4A, first incident light IPL1 is emitted from the first to fifth light sources LS1 to LS5 so that the first incident light IPL1 may be incident into the optical waveguides OWG. The first incident light IPL1 may be guided to the first to fifth optical output units OPC1 to OPC5 through the optical waveguides OWG. The first incident light IPL1 may be emitted as the first output light OPL1 through the first to fifth optical output units OPC1 to OPC5. The first output light OPL1 may be irradiated to the photothermal response layer PTR.

According to embodiments of the inventive concept, the optical output unit OPC of the cell area CEL may radiate first output light OPL1 to the photothermal response layer PTR of the corresponding cell area CEL. The photothermal response layer PTR of the cell area CEL may emit thermal energy in response to the incident first output light OPL1. Thermal energy THE emitted from the photothermal response layer PTR may be transferred to the shape deformation layer SDP of the corresponding cell area CEL.

The shape deformation layer SDP of the corresponding cell area CEL may be heated by thermal energy to reach a first temperature. The first temperature may be higher than room temperature. As the shape deformation layer SDP reaches the first temperature, the elastic modulus of the shape deformation layer SDP may decrease and the shape deformation layer SDP may become more ductile. Also, the CTE of the shape deformation layer SDP may increase.

According to the difference between the changed CTE of the shape deformation layer SDP and the CTE of the photothermal response layer PTR under the first temperature, the magnitude and direction of the physical bending deformation may vary.

For example, the changed CTE of the shape deformation layer SDP at the first temperature may be smaller than the CTE of the photothermal response layer PTR. As a result, as shown in FIG. 4A, bending deformation of the cell area CEL may occur in a direction opposite to the third direction D3, that is, in a downward direction. At the first temperature, the surface of the cell area CEL may be concave.

Referring to FIG. 4B, the second incident light IPL2 may be emitted from the first to fifth light sources LS1 to LS5 and the second output light OPL2 may be incident to the photothermal response layer PTR. According to this embodiment, the intensity of the second output light OPL2 may be greater than that of the aforementioned first output light OPL1.

The shape deformation layer SDP of the corresponding cell area CEL may be heated by thermal energy to reach the second temperature. The second temperature may be higher than the first temperature described above. An elastic modulus of the shape deformation layer SDP at the second temperature may be smaller than an elastic modulus of the shape deformation layer SDP at the first temperature. The CTE of the shape deformation layer SDP at the second temperature may be greater than the CTE of the shape deformation layer SDP at the first temperature.

For example, the changed CTE of the shape deformation layer SDP at the second temperature may be greater than the CTE of the photothermal response layer PTR. As a result, as shown in FIG. 4B, bending deformation of the corresponding cell area CEL may occur in the third direction D3, that is, in the upward direction. At the second temperature, the surface of the cell area CEL may become convex.

In FIGS. 4A and 4B, incident light is equally emitted from all of the first to fifth light sources LS1 to LS5, but the inventive concept is not limited thereto. The first to fifth light sources LS1 to LS5 may operate independently of each other through the control unit CNT described with reference to FIG. 1. That is, some of the first to fifth light sources LS1 to LS5 may emit the first incident light IPL1, and some of the first to fifth light sources LS1 to LS5 may not emit light. That is, some of the first to fifth light sources LS1 to LS5 may emit the first incident light IPL1, and some of the first to fifth light sources LS1 to LS5 may emit the second incident light IPL2.

More specifically, referring to FIG. 4C, the second incident light IPL2 may be emitted from the first light source LS1 and the first incident light IPL1 may be emitted from the fifth light source LS5. Meanwhile, light may not be emitted from the second to fourth light sources LS2 to LS4. In the case of the first cell area CEL1, as the shape deformation layer SDP is heated to the second temperature, the surface of the first cell area CEL1 may change to be convex. In the case of the fifth cell area CEL5, the surface of the fifth cell area CEL5 may change to be concave as the shape deformation layer SDP is heated to the first temperature. Meanwhile, surfaces of the second to fourth cell areas CEL2 to CEL4 may not change.

As described above, as the first to fifth light sources LS1 to LS5 are individually controlled through the control unit CNT, the shapes of the first to fifth cell areas CEL1 to CEL5 may be individually changed. The stereoscopic surface display device according to the inventive concept may implement various three-dimensional shapes in the stereoscopic display unit SSD by individually controlling the first to fifth light sources LS1 to LS5.

The stereoscopic surface display device according to embodiments of the inventive concept may heat the shape deformation layer SDP using a photothermal response method without heating the shape deformation layer SDP using a Joule heating method. Accordingly, only the shape deformation layer SDP of the cell area CEL may be locally heated within a short period of time. In addition, according to embodiments of the inventive concept, since a joule heating electrode is not used, a flexible device may be implemented.

The surface of the shape deformation layer SDP of the cell area CEL is changed, and the corresponding cell area CEL may have a specific color through an optical output unit OPC. For example, the inventive concept may form a braille type button on a display. The user may input information to the device of the inventive concept by recognizing the changed surface of the shape deformation layer SDP through visual and tactile senses and touching it.

As a stereoscopic surface display device according to a comparative example of the inventive concept, there is a device that provides a vibrating tactile sensation in a flexible touch interface using a flexible actuator based on a polymer active material. There is also a device that deforms a flexible polymer thin film using hydraulic pressure or pneumatic pressure, or a device that combines a joule heating and a material with variable mechanical properties.

However, in the case of a device that implements a vibratory tactile sensation by using a shape deformation of a polymer material, a decrease in vibratory tactile sensation occurs due to the ductility of the material. In the case of technology using hydraulic pressure or pneumatic pressure, it is difficult to miniaturize the device due to the hydraulic pressure supply unit or the pneumatic pressure supply unit. In the case of a technique using joule heating, a change in electrical resistance occurs due to a force applied to the joule heating electrode, and thus durability of the electrode may be deteriorated. In addition, when heating a polymeric material through joule heating, there is a problem in that it is difficult to uniformly heat the material within a short period of time.

According to embodiments of the inventive concept, since the stereoscopic display unit SSD does not use a mechanical driving unit, it may have a thin structure. That is, miniaturization and flexibility of the stereoscopic display unit SSD are possible. Since the stereoscopic surface display device according to the inventive concept changes the mechanical properties of a material based on a photothermal response, the material may be quickly and uniformly heated. The device of the inventive concept may be used as a flexible device and/or a wearable device.

The device according to the inventive concept may independently control the physical shape and deformation direction of the cell area. As a result, the device of the inventive concept has a simple structure, high durability, and may realize three-dimensional deformation of the surface with high resolution. Since the device according to the inventive concept may implement various shapes and colors, it may be applied to a shape-changing input device for automobiles/mobile devices, a braille display for the visually impaired, a teaching material for realistic interaction education, or a museum artifact experience type device.

In the stereoscopic surface display device according to embodiments of the inventive concept, partition walls defining a plurality of cell areas CEL may not exist. A plurality of cell areas CEL may share a photothermal response layer PTR and a shape deformation layer SDP with each other. The display device of the inventive concept may implement various three-dimensional shapes with a simple configuration by controlling only the on/off of the light sources disposed on the sides.

Figure 5:
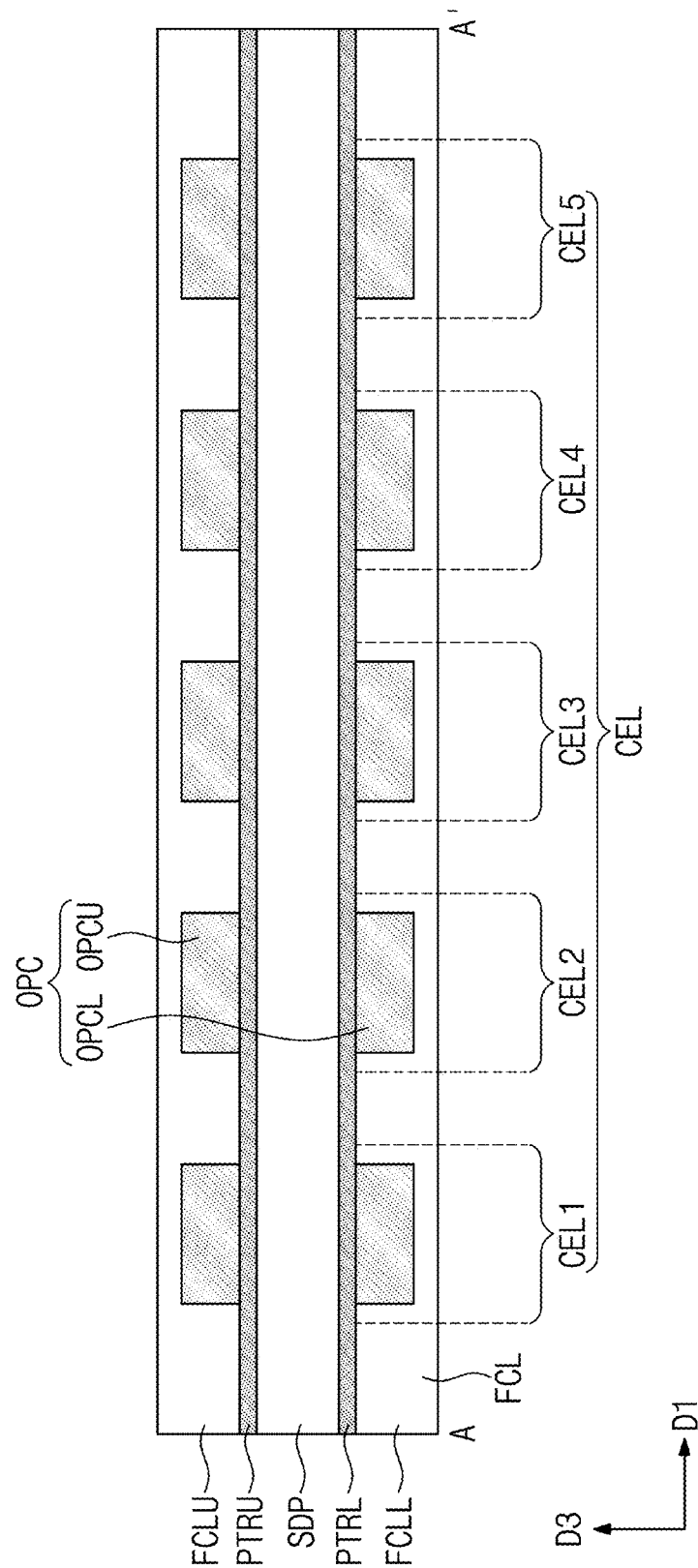
FIG. 5 is a cross-sectional view corresponding to the line A-A' of FIG. 1 for explaining a shape changeable display according to another embodiment of the inventive concept.

FIG. 5 is a cross-sectional view corresponding to the line A-A' of FIG. 1 for explaining a shape changeable display according to another embodiment of the inventive concept. In this embodiment, descriptions of technical features overlapping with those previously described with reference to FIGS. 2 and 3 will be omitted, and differences will be described in detail.

Referring to FIG. 5, a stereoscopic display unit SSD may include a sequentially stacked first flexible layer FCLL, first photothermal response layer PTRL, shape deformation layer SDP, second photothermal response layer PTRU, and second flexible layer FCLU. The shape deformation layer SDP may be disposed between the first photothermal response layer PTRL and the second photothermal response layer PTRU.

The shape deformation layer SDP of this embodiment may be substantially the same as the shape deformation layer SDP previously described with reference to FIG. 3. Each of the first flexible layer FCLL and the second flexible layer FCLU of the present embodiment may be substantially the same as the flexible layer FCL previously described with reference to FIG. 3. The first flexible layer FCLL and the second flexible layer FCLU may include the same or different materials. Each of the first photothermal response layer PTRL and the second photothermal response layer PTRU of this embodiment may be substantially the same as the photothermal response layer PTR previously described with reference to FIG. 3. The first photothermal response layer PTRL and the second photothermal response layer PTRU may include the same or different materials.

A lower optical output unit OPCL and an upper optical output unit OPCU may be provided in the cell area CEL. Each of the lower optical output unit OPCL and the upper optical output unit OPCU of this embodiment may be substantially the same as the optical output unit OPC previously described with reference to FIG. 3. The lower optical output unit OPCL and the upper optical output unit OPCU may vertically overlap each other.

The lower optical output unit OPCL and the upper optical output unit OPCU may be connected to different light sources, respectively. Accordingly, the lower optical output unit OPCL and the upper optical output unit OPCU may be individually controlled.

The lower optical output unit OPCL may be provided in the first flexible layer FCLL. The lower optical output unit OPCL may contact the first photothermal response layer PTRL. In other words, the lower optical output unit OPCL may be configured to radiate light to the first photothermal response layer PTRL, and the first photothermal response layer PTRL may be configured to convert the radiated light into thermal energy.

The upper optical output unit OPCU may be provided in the second flexible layer FCLU. The upper optical output unit OPCU may contact the second photothermal response layer PTRU. In other words, the upper optical output unit OPCU is configured to radiate light to the second photothermal response layer PTRU, and the second photothermal response layer PTRU may be configured to convert the radiated light into thermal energy.

Figure 6A:
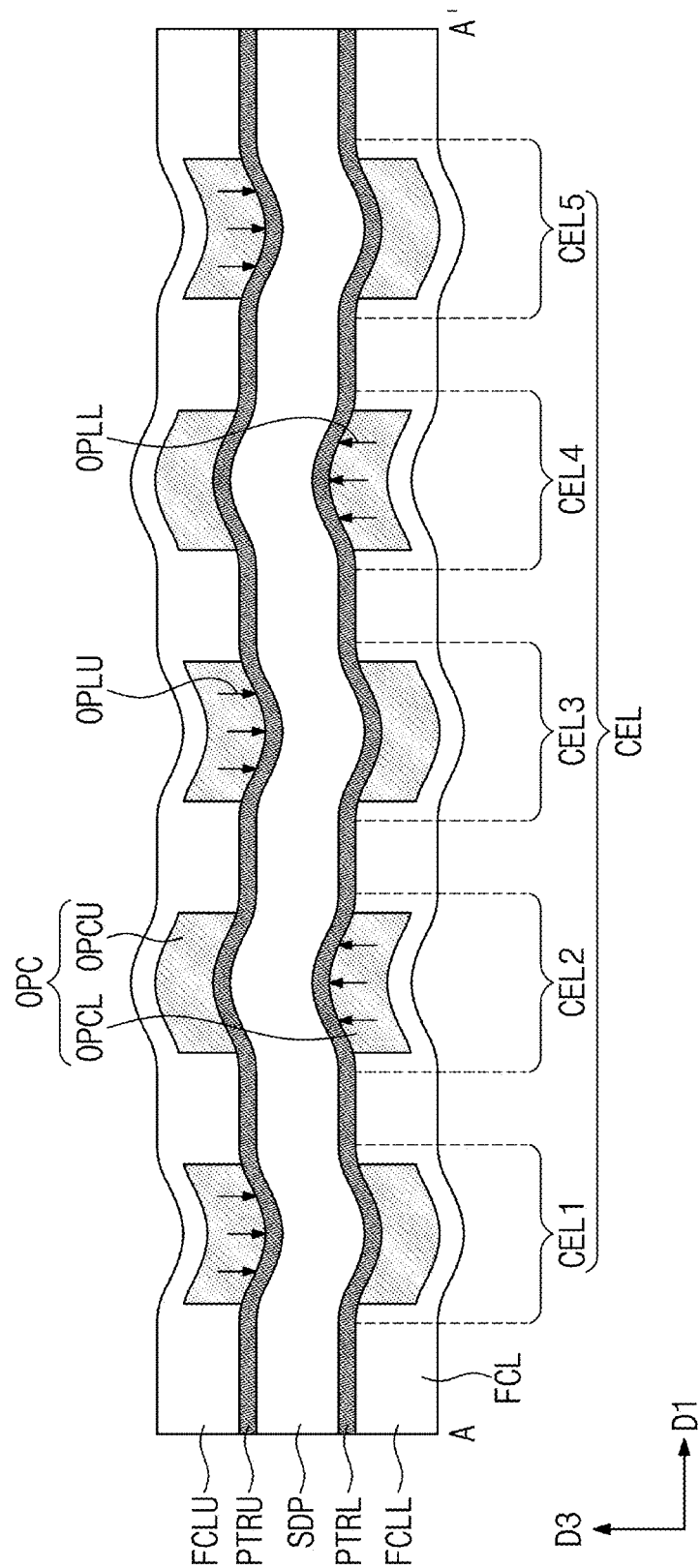
FIGS. 6A, 6B and 6C are cross-sectional views for explaining the operation of a stereoscopic surface display device according to embodiments of the inventive concept.
Figure 6B:
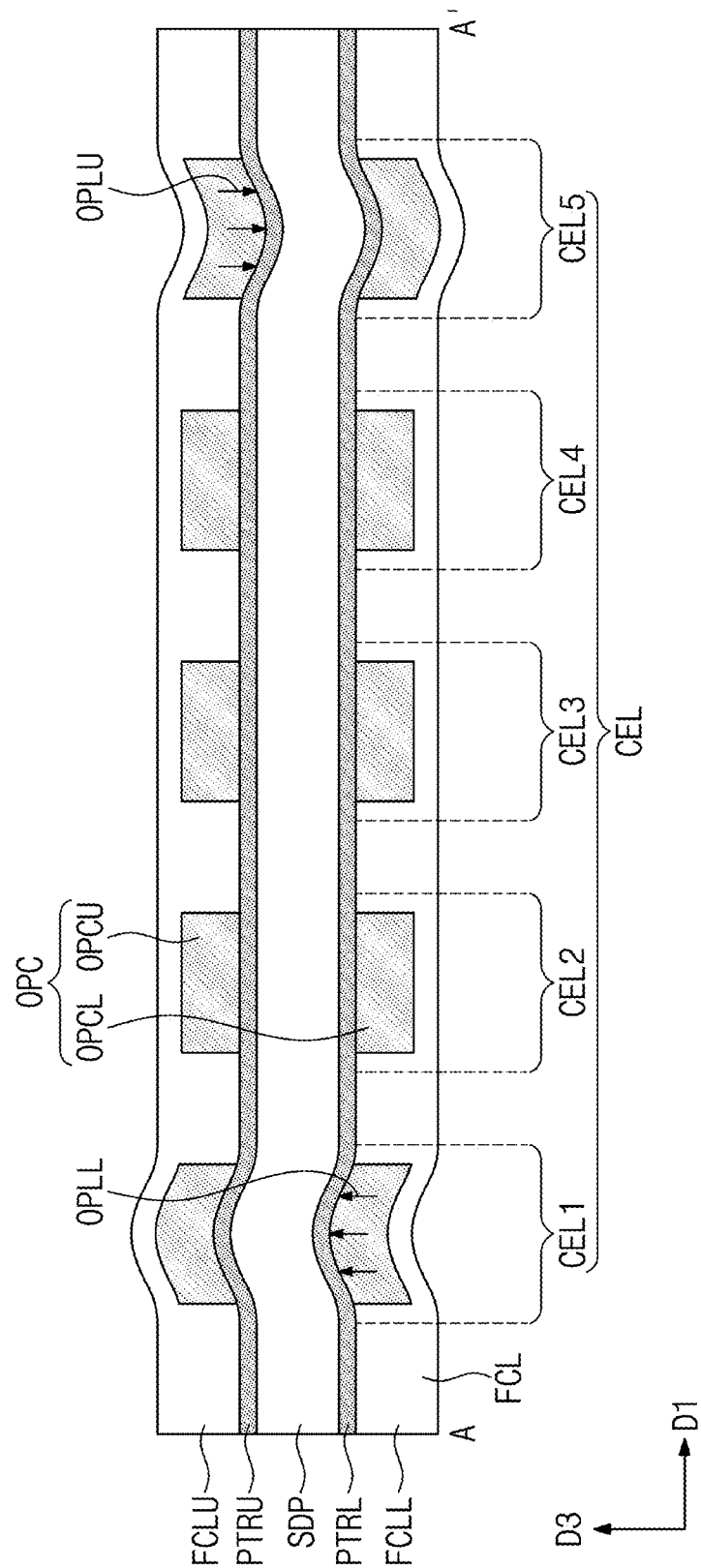
Figure 6C:
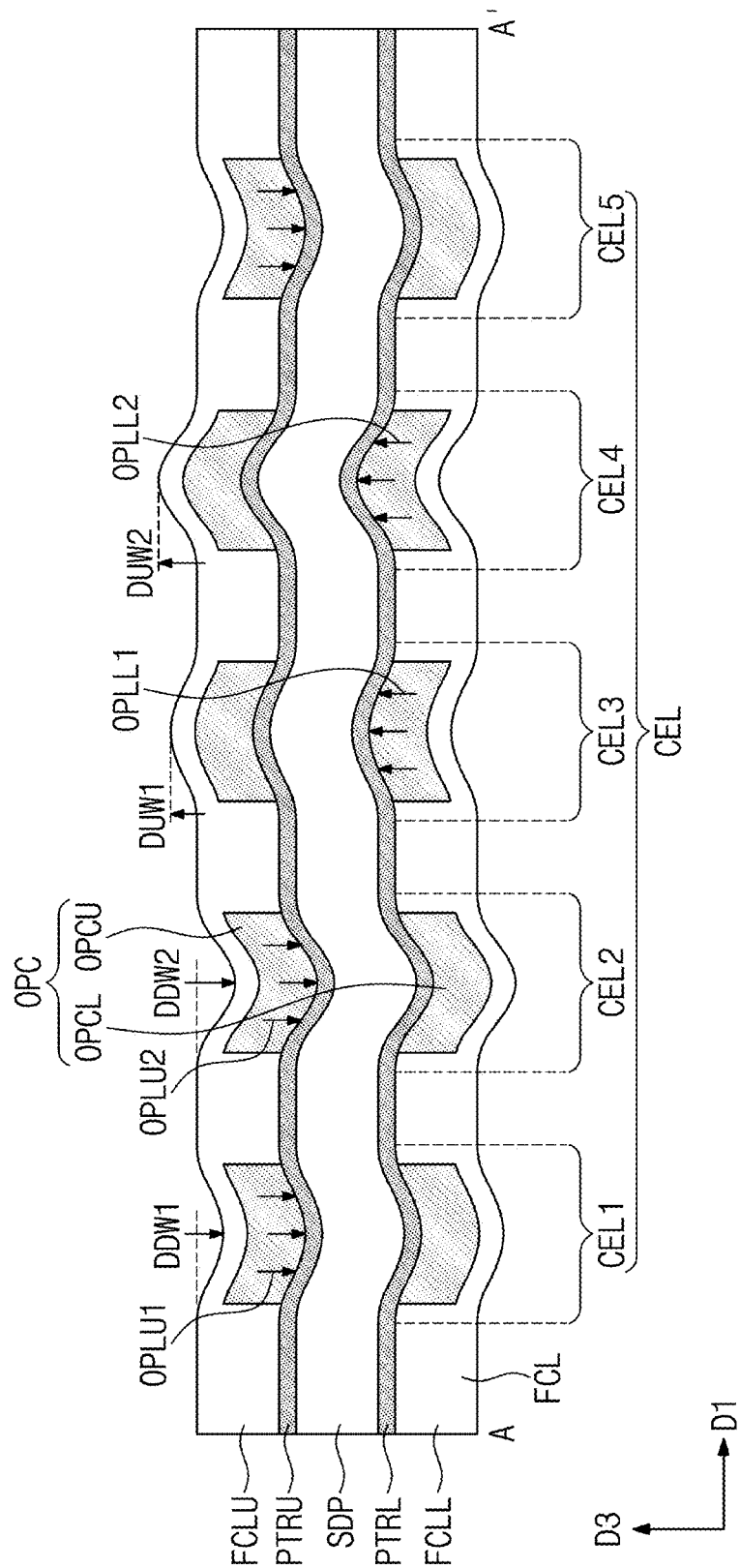

FIGS. 6A, 6B and 6C are cross-sectional views for explaining the operation of a stereoscopic surface display device according to embodiments of the inventive concept. In this embodiment, descriptions of technical features overlapping with those previously described with reference to FIGS. 4A and 4C will be omitted, and differences will be described in detail.

Referring to FIG. 6A, upper light OPLU may be output from the upper optical output units OPCU of the first, third, and fifth cell areas CEL1, CEL3, and CEL5. The upper light OPLU may be irradiated onto the second photothermal response layer PTRU of the first, third, and fifth cell areas CEL1, CEL3, and CEL5.

The lower light OPLL may be output from the lower optical output units OPCL of the second and fourth cell areas CEL2 and CEL4. The lower light OPLL may be irradiated onto the first photothermal response layer PTRL of the second and fourth cell areas CEL2 and CEL4.

By the second photothermal response layer PTRU of the first, third, and fifth cell areas CEL1, CEL3, and CEL5, temperatures of the shape deformation layers SDP of the first, third, and fifth cell areas CEL1, CEL3, and CEL5 may increase. The CTE of the shape deformation layers SDP of the first, third, and fifth cell areas CEL1, CEL3, and CEL5 may be greater than the CTE of the second photothermal response layer PTRU. Accordingly, bending deformation may occur in the first, third, and fifth cell areas CEL1, CEL3, and CEL5 in a downward direction.

By the first photothermal response layer PTRL of the second and fourth cell areas CEL2 and CEL4, the temperature of the shape deformation layer SDP of the second and fourth cell areas CEL2 and CEL4 may increase. The CTE of the shape deformation layer SDP of the second and fourth cell areas CEL2 and CEL4 may be greater than the CTE of the first photothermal response layer PTRL. As a result, bending deformation may occur in the second and fourth cell areas CEL2 and CEL4 in an upward direction.

According to this embodiment, by independently controlling the lower optical output unit OPCL and the upper optical output unit OPCU in each cell area CEL, the direction of bending deformation of the cell area CEL may be controlled. According to this embodiment, the surface of a stereoscopic display unit SSD may be controlled to have a wavy shape.

Referring to FIG. 6B, the first to fifth cell areas CEL1 to CEL5 may be individually controlled. For example, by operating the lower optical output unit OPCL of the first cell area CEL1, the first cell area CEL1 may be bent upward. The upper optical output unit OPCU of the fifth cell area CEL5 may be operated to bend the fifth cell area CEL5 downward. On the other hand, the optical output units of the second to fourth cell areas CEL2, CEL3, and CEL4 do not operate, so that the second to fourth cell areas CEL2, CEL3, and CEL4 may maintain flat surfaces.

Referring to FIG. 6C, the degree of bending deformation may be adjusted by adjusting the intensity of output light from the optical output unit. For example, the upper optical output unit OPCU of the first cell area CEL1 may output the first upper light OPLU1, and the upper optical output unit OPCU of the second cell area CEL2 may output the second upper light OPLU2. In this case, the intensity of the second upper light OPLU2 may be greater than that of the first upper light OPLU1. Accordingly, the temperature of the shape deformation layer SDP of the first cell area CEL1 may be lower than the temperature of the shape deformation layer SDP of the second cell area CEL2. As a result, the first cell area CEL1 may be bent downward by the first downward displacement DDW1, and the second cell area CEL2 may be bent downward by the second downward displacement DDW2. The second downward displacement DDW2 may be greater than the first downward displacement DDW1.

The lower optical output unit OPCL of the third cell area CEL3 may output the first lower light OPLL1, and the lower optical output unit OPCL of the fourth cell area CEL4 may output the second lower light OPLL2. In this case, the intensity of the second lower light OPLL2 may be greater than that of the first lower light OPLL1. Accordingly, the temperature of the shape deformation layer SDP of the third cell area CEL3 may be lower than the temperature of the shape deformation layer SDP of the fourth cell area CEL4. As a result, the third cell area CEL3 may be bent downward by the first upward displacement DUW1, and the fourth cell area CEL4 may be bent downward by the second upward displacement DUW2. The second upward displacement DUW2 may be greater than the first upward displacement DUW1.

As in the present embodiment, the surface of the stereoscopic display unit SSD according to the inventive concept may be controlled to be curved in different directions and different displacements for each cell area CEL. Accordingly, the stereoscopic display unit SSD of the inventive concept may realize more diverse stereoscopic shapes.

Figure 7:
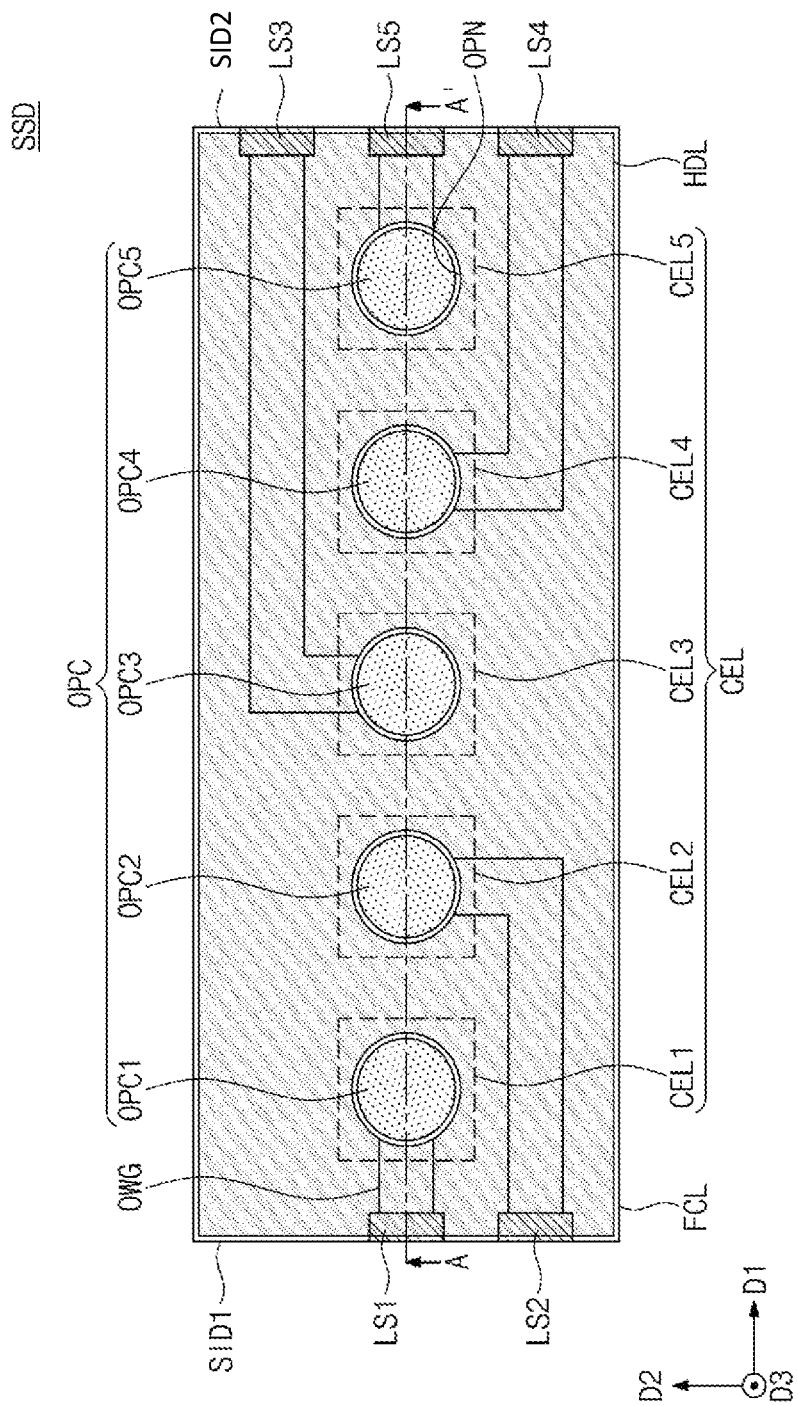
FIG. 7 is a plan view for explaining a stereoscopic display unit according to another embodiment of the inventive concept.
Figure 8:
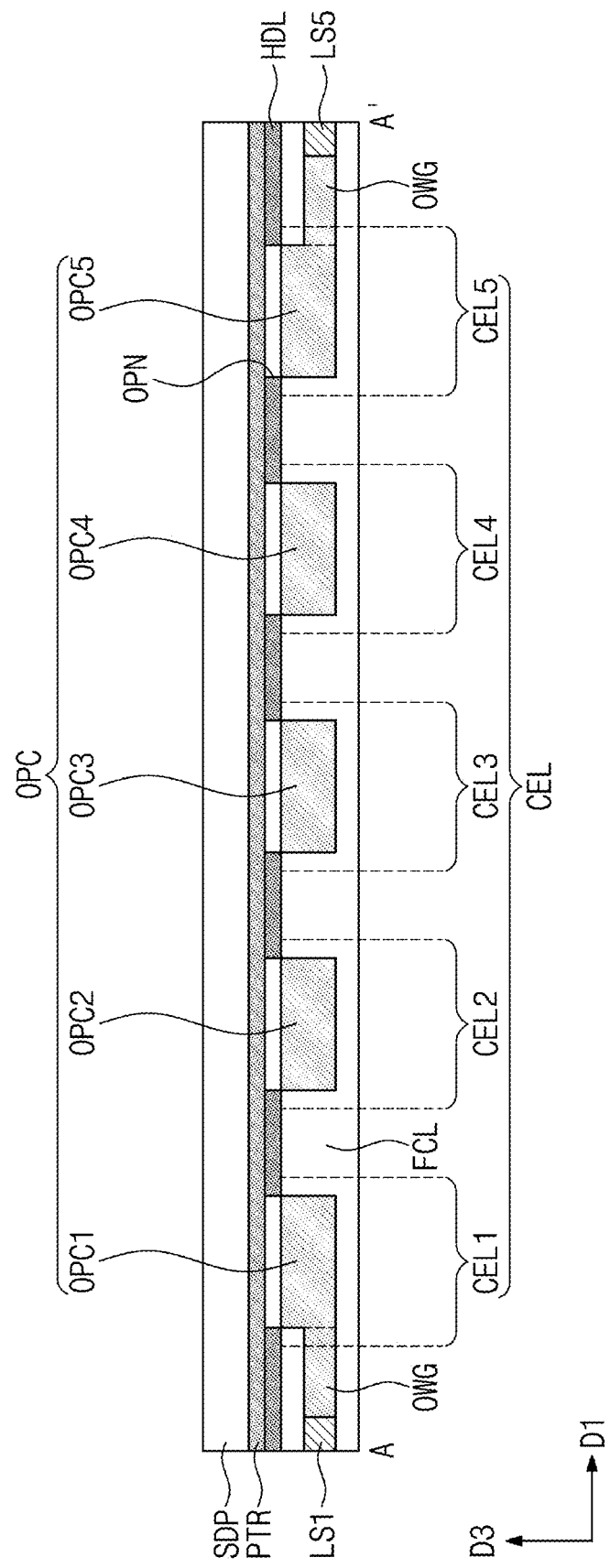
FIG. 8 is a cross-sectional view taken along the line A-A' of FIG. 7.

FIG. 7 is a plan view for explaining a stereoscopic display unit according to another embodiment of the inventive concept. FIG. 8 is a cross-sectional view taken along line A-A' of FIG. 7. In this embodiment, descriptions of technical features overlapping with those previously described with reference to FIGS. 2 and 3 will be omitted, and differences will be described in detail.

Referring to FIGS. 7 and 8, a heat diffusion layer HDL may be additionally provided between the flexible layer FCL and the photothermal response layer PTR. In one embodiment, the heat diffusion layer HDL may include an opening OPN exposing an optical output unit OPC. Accordingly, light output from the optical output unit OPC may be directly incident to the photothermal response layer PTR.

The heat diffusion layer HDL may be configured to rapidly cool the shape deformation layer SDP between adjacent cell areas CEL. For example, when the shape deformation layer SDP of the first cell area CEL1 and the shape deformation layer SDP of the second cell area CEL2 are heated, the heat diffusion layer HDL may cool the shape deformation layer SDP between the first and second cell areas CEL1 and CEL2. Accordingly, a change in physical properties of the shape deformation layer SDP between the first and second cell areas CEL1 and CEL2 due to thermal diffusion from the first and second cell areas CEL1 and CEL2 may be prevented. In addition, the heat diffusion layer HDL may help maintain the shape of the cell area CEL after deformation.

For the heat diffusion layer HDL, it may be desirable to use a material having high rigidity and a small change in physical properties according to temperature change. The heat diffusion layer HDL may include a material having high thermal conductivity. For example, the heat diffusion layer HDL may include at least one selected from the group consisting of graphene oxide, carbon nanotubes, and metals (e.g., gold, silver, and/or copper). The metal may have a particle or mesh network structure. In another embodiment, the heat diffusion layer HDL may include a polymer film having low thermal deformation (e.g., polyimide) and carbon or metal coated or embedded in the polymer film.

The heat diffusion layer HDL according to the present embodiment may clearly define a physical boundary between adjacent cell areas CEL. Accordingly, it is possible to secure the consistency of the deformation shape of each cell area CEL and increase the spatial resolution of the deformation of the cell area CEL. The heat diffusion layer HDL may improve the deformation spatial resolution of a stereoscopic display unit SSD and help maintain the deformed shape through rapid thermal dissipation.

Figure 9A:
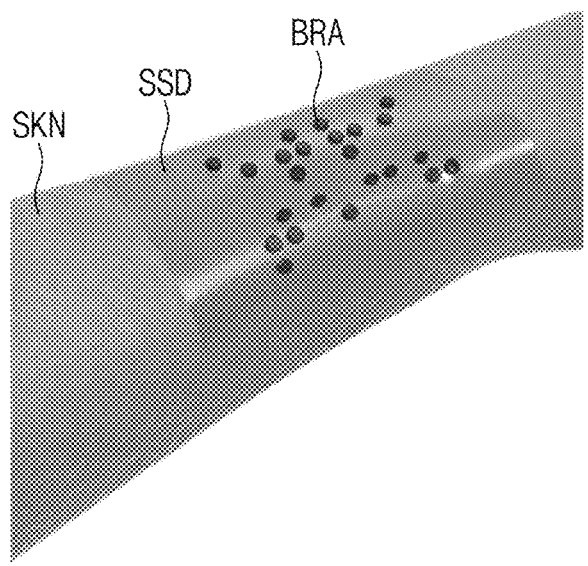
FIGS. 9A and 9B are diagrams illustrating an example of a stereoscopic surface display device according to an embodiment of the inventive concept.
Figure 9B:
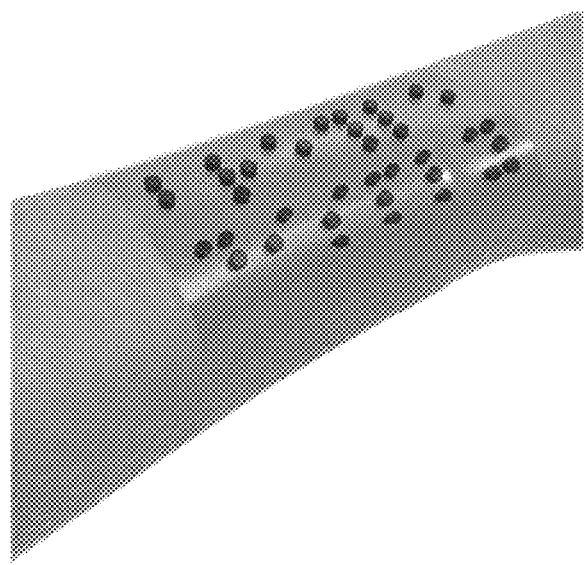

FIGS. 9A and 9B are diagrams illustrating an example of a stereoscopic surface display device according to an embodiment of the inventive concept. Referring to FIGS. 9A and 9B, the stereoscopic surface display device of the inventive concept may be used as a wearable braille display. Braille books have a disadvantage in that they are bulky and heavy to carry. Recently, a tablet-type braille device using an actuator such as a voice coil, a motor, or a magnet has been developed, but a tablet is not suitable for use outside activities.

In contrast, the stereoscopic surface display device of the inventive concept may be configured to be wearable and may freely output Braille. As shown in FIGS. 9A and 9B, the above-described stereoscopic display unit SSD may be attachable to the skin SKN. A stereoscopic display unit SSD may provide a target Braille BRA. The stereoscopic display unit SSD is light, so it may be easily carried with less inconvenience when attached to the skin SKN. A stereoscopic surface display device may output various information required during activities of the visually impaired in Braille BRA.

Figure 10A:
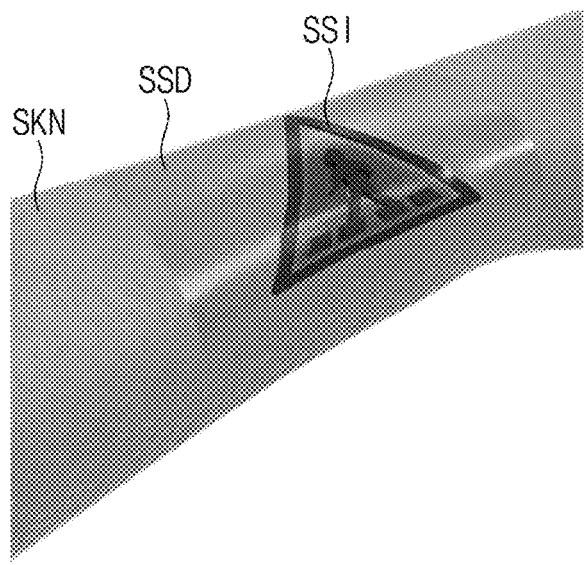
FIGS. 10A and 10B are diagrams illustrating an example of a stereoscopic surface display device according to an embodiment of the inventive concept.
Figure 10B:
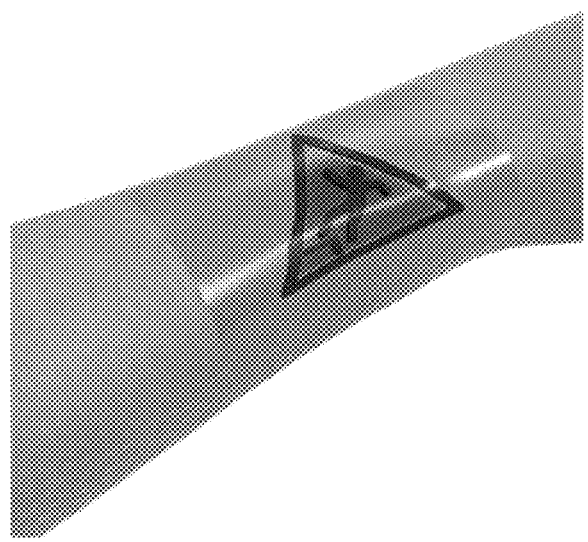

FIGS. 10A and 10B are diagrams illustrating an example of a stereoscopic surface display device according to an embodiment of the inventive concept. Referring to FIGS. 10A and 10B, the stereoscopic surface display device of the inventive concept may provide unsigned figure information SSI.

For example, as shown in FIGS. 10A and 10B, the stereoscopic display unit SSD may be attachable to the skin SKN. The stereoscopic display unit SSD may create a gap of 2.3 mm to 2.5 mm between deformed regions like the Braille BRA shown in FIGS. 9A and 9B. In addition, the stereoscopic display unit SSD may be capable of continuous surface deformation as shown in FIGS. 10A and 10B. That is, the deformation of individual cell areas is independent, but the deformations of cell areas are connected to each other to realize continuous surface deformation.

As the stereoscopic display unit SSD implements three-dimensional figure information SSI, pedestrian information such as a crosswalk and danger sign information (e.g., danger of electric shock, prohibition of access, danger of falling, or under construction) may be provided in the form of figures rather than braille.

Figure 11A:
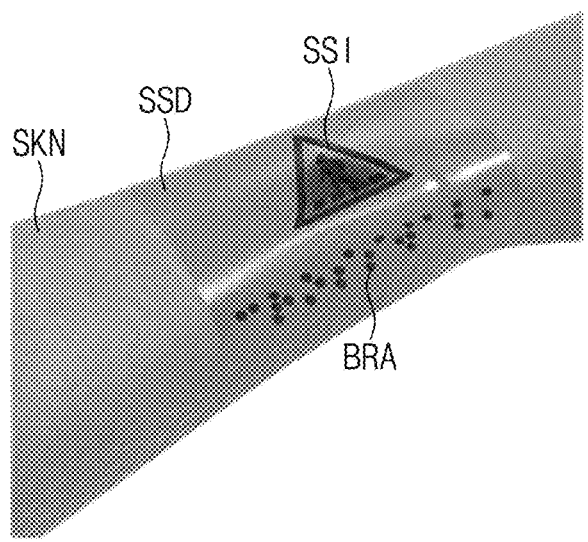
FIGS. 11A and 11B are diagrams illustrating an example of a stereoscopic surface display device according to an embodiment of the inventive concept.
Figure 11B:
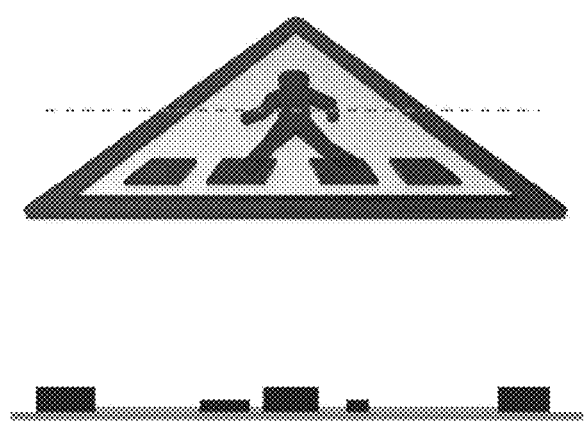

FIGS. 11A and 11B are diagrams illustrating an example of a stereoscopic surface display device according to an embodiment of the inventive concept. Referring to FIGS. 11A and 11B, the stereoscopic surface display device of the inventive concept may simultaneously provide figure information SSI and braille BRA.

The stereoscopic display unit SSD attachable to the skin SKN may output figure information SSI on a first area and output braille BRA on a second area. By simultaneously providing figure information SSI and Braille BRA, more detailed information may be provided to the user.

The stereoscopic surface display device according to the inventive concept has high durability and may realize three-dimensional deformation of the surface with high resolution. Since the stereoscopic surface display device of the inventive concept has a simple configuration, it may be easily bent and wearable. Since the device of the inventive concept changes the mechanical properties of the material based on the photothermal response, rapid deformation of the material is possible.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A stereoscopic surface display device comprising a stereoscopic display unit having a cell area,
   wherein the stereoscopic display unit comprises:
   a first flexible layer;
   a first optical waveguide and a first optical output unit that are in the first flexible layer, the first optical output unit being disposed in the cell area;
   a first light source disposed on a side of the stereoscopic display unit, the first optical waveguide connecting the first light source and the first optical output unit;
   a first photothermal response layer on the first flexible layer, the first photothermal response layer being configured to receive output light emitted from the first optical output unit and emit thermal energy; and
   a shape deformation layer on the first photothermal response layer,
   wherein the shape deformation layer is configured to generate bending deformation by receiving the thermal energy from the first photothermal response layer.

2. The stereoscopic surface display device of claim 1, further comprising a control unit for controlling the first light source.

3. The stereoscopic surface display device of claim 2, wherein the control unit is disposed outside the stereoscopic display unit.

4. The stereoscopic surface display device of claim 1, wherein the shape deformation layer is configured to receive the thermal energy and change a coefficient of thermal expansion,
   wherein a magnitude and a direction of the bending deformation are controlled according to an amount of change in the coefficient of thermal expansion.

5. The stereoscopic surface display device of claim 1, wherein the stereoscopic display unit further comprises:
   a second photothermal response layer on the shape deformation layer;
   a second flexible layer on the second photothermal response layer; and
   a second optical output unit in the second flexible layer,
   wherein the second optical output unit is disposed within the cell area and vertically overlaps the first optical output unit,
   wherein the shape deformation layer is sandwiched between the first photothermal response layer and the second photothermal response layer.

6. The stereoscopic surface display device of claim 5, wherein the first optical output unit and the second optical output unit are each independently controlled from each other.

7. The stereoscopic surface display device of claim 1, wherein the stereoscopic display unit further comprises a heat diffusion layer between the first flexible layer and the first photothermal response layer.

8. The stereoscopic surface display device of claim 7, wherein the heat diffusion layer has an opening exposing the first optical output unit.

9. The stereoscopic surface display device of claim 1, wherein the stereoscopic display unit is configured to be attachable to skin.

10. The stereoscopic surface display device of claim 1, wherein the first photothermal response layer is a polymer film including a photo-thermal material.

11. The stereoscopic surface display device of claim 1, wherein the shape deformation layer comprises a shape memory polymer.

12. A stereoscopic surface display device comprising a stereoscopic display unit having a plurality of cell areas,
    wherein the stereoscopic display unit comprises;
    a first flexible layer;
    a plurality of lower optical output units in the first flexible layer, the plurality of lower optical output units being disposed in the plurality of cell areas, respectively;
    a first photothermal response layer on the first flexible layer, wherein the first photothermal response layer is configured to receive lower light emitted from the plurality of lower optical output units and emit first thermal energy;
    a shape deformation layer on the first photothermal response layer;
    a second photothermal response layer on the shape deformation layer;
    a second flexible layer on the second photothermal response layer; and
    a plurality of upper optical output units in the second flexible layer,
    wherein the second photothermal response layer is configured to receive upper light emitted from the plurality of upper optical output units and emit second thermal energy.

13. The stereoscopic surface display device of claim 12, wherein bending deformation occurs through the first thermal energy or the second thermal energy in each of the plurality of cell areas.

14. The stereoscopic surface display device of claim 12, further comprising:
    a plurality of light sources disposed on a side of the stereoscopic display unit; and
    a controller for controlling the plurality of light sources.

15. An operating method of a stereoscopic surface display device including a stereoscopic display unit having a cell area,
    wherein the stereoscopic display unit comprises:
    a flexible layer;
    an optical waveguide and an optical output unit that are in the flexible layer, the optical output unit being disposed in the cell area;
    a light source disposed on a side of the stereoscopic display unit, the optical waveguide connecting the light source and the optical output unit;
    a photothermal response layer on the flexible layer; and
    a shape deformation layer on the photothermal response layer,
    wherein the operating method comprises:
    irradiating incident light from the light source to the optical waveguide, the optical waveguide guiding the incident light to the optical output unit;

emitting output light from the optical output unit to the photothermal response layer, the photothermal response layer receiving the output light and generating thermal energy;

heating the shape deformation layer using the thermal energy, the shape deformation layer being heated so that a modulus of elasticity in the shape deformation layer decreases and a coefficient of thermal expansion in the shape deformation layer increases; and generating bending deformation in the shape deformation layer through a difference between the increased coefficient of thermal expansion of the shape deformation layer and a coefficient of thermal expansion of the photothermal response layer.

16. The operating method of claim 15, wherein the stereoscopic surface display device further comprises a control unit for controlling the light source.

17. The operating method of claim 15, wherein the stereoscopic display unit further comprises a sensor unit, wherein the operating method further comprises recognizing a user's touch applied to the cell area whose shape has changed by using the sensor unit.

18. The operating method of claim 15, wherein a portion of the shape deformation layer that is outside the cell area does not change a shape of the portion.

* * * * *